(12) United States Patent
Weingartner

(10) Patent No.: US 10,985,518 B2
(45) Date of Patent: Apr. 20, 2021

(54) LASERS WITH SETBACK APERTURE

(71) Applicant: IRADION LASER, INC., Uxbridge, MA (US)

(72) Inventor: Wendelin Weingartner, Brooklyn, NY (US)

(73) Assignee: IRADION LASER, INC., Uxbridge, MA (US)

(*) Notice: Subject to any disclaimer, the term of this patent is extended or adjusted under 35 U.S.C. 154(b) by 0 days.

(21) Appl. No.: 16/334,985

(22) PCT Filed: Sep. 20, 2017

(86) PCT No.: PCT/US2017/052414
§ 371 (c)(1),
(2) Date: Mar. 20, 2019

(87) PCT Pub. No.: WO2018/057567
PCT Pub. Date: Mar. 29, 2018

(65) Prior Publication Data
US 2019/0267768 A1    Aug. 29, 2019

Related U.S. Application Data

(60) Provisional application No. 62/397,155, filed on Sep. 20, 2016.

(51) Int. Cl.
*H01S 3/03* (2006.01)
*H01S 3/038* (2006.01)
*H01S 3/08* (2006.01)

(52) U.S. Cl.
CPC ............ *H01S 3/0315* (2013.01); *H01S 3/038* (2013.01); *H01S 3/08059* (2013.01); *H01S 3/08081* (2013.01); *H01S 3/08095* (2013.01)

(58) Field of Classification Search
CPC .............. H01S 3/0315; H01S 3/08081; H01S 3/08059; H01S 3/038; H01S 3/08095
See application file for complete search history.

(56) References Cited

U.S. PATENT DOCUMENTS 3,950,712 A    4/1976  Chenausky et al.
4,169,251 A    9/1979  Laakmann
(Continued)

FOREIGN PATENT DOCUMENTS

CN    101420101 A    4/2009
DE    19734641 A1    2/1999
(Continued)

OTHER PUBLICATIONS

PCT International Search Report and Written Opinion for PCT/US2017/052414, completed Nov. 10, 2017 (dated Oct. 11, 2017), 11 pages.
(Continued)

*Primary Examiner* — Yuanda Zhang
(74) *Attorney, Agent, or Firm* — Barnes & Thornburg LLP

(57) ABSTRACT

The present disclosure relates, generally, to lasers and, more particularly, to lasers with a setback aperture. In one in illustrative embodiment, a laser comprises front and rear resonator mirrors, an output window positioned near the front resonator mirror, and a plurality of waveguide walls extending between the front and rear resonator mirrors and extending between the rear resonator mirror and an aperture defined by the plurality of waveguide walls, such that a laser beam formed between the front and rear resonator mirrors will propagate in free-space between the aperture and the output window so that a first cross-sectional profile of the
(Continued)

laser beam at the aperture will be different than a second cross-sectional profile of the laser beam at the output window.

20 Claims, 7 Drawing Sheets

(56)  References Cited

U.S. PATENT DOCUMENTS

| | | | |
|---|---|---|---|
| 4,373,202 A | 2/1983 | Laakmann et al. |
| 4,393,506 A | 7/1983 | Laakmann et al. |
| 4,455,658 A | 6/1984 | Sutter |
| 4,493,087 A | 1/1985 | Laakman et al. |
| 4,596,018 A | 6/1986 | Gruber et al. |
| 4,719,639 A | 1/1988 | Tulip |
| 4,720,691 A | 1/1988 | Rammos |
| 4,805,182 A | 2/1989 | Laakmann |
| 4,837,772 A | 6/1989 | Laakmann |
| 4,939,738 A | 7/1990 | Opower |
| 5,008,894 A | 4/1991 | Laakmann |
| 5,048,048 A | 9/1991 | Nishimae et al. |
| 5,065,405 A | 11/1991 | Laakmann et al. |
| 5,155,739 A | 10/1992 | Mefferd |
| 5,216,689 A | 6/1993 | Gardner et al. |
| 5,220,577 A | 6/1993 | Opower |
| 5,272,714 A | 12/1993 | Chen et al. |
| 5,307,358 A | 4/1994 | Scheps |
| 5,386,431 A | 1/1995 | Tulip |
| 5,409,314 A | 4/1995 | Laakmann |
| 5,592,504 A | 1/1997 | Cameron |
| 5,602,865 A | 2/1997 | Laakmann |
| 5,646,765 A | 7/1997 | Laakmann et al. |
| 5,661,746 A | 8/1997 | Sukhman et al. |
| 5,754,575 A | 5/1998 | Sukhman et al. |
| 5,805,754 A | 9/1998 | Zhang |
| 5,822,354 A | 10/1998 | Vitruk |
| 5,881,087 A | 3/1999 | Sukhman et al. |
| 5,892,782 A | 4/1999 | Vitruk et al. |
| 5,953,360 A | 9/1999 | Vitruk et al. |
| 6,195,379 B1 | 2/2001 | Jones et al. |
| 6,198,758 B1 | 3/2001 | Broderick et al. |
| 6,198,759 B1 | 3/2001 | Broderick et al. |
| 6,599,034 B2 | 7/2003 | Tatoh et al. |
| 6,603,794 B2 | 8/2003 | Bethel et al. |
| 6,614,826 B1 | 9/2003 | Bethel et al. |
| 6,856,639 B2 | 2/2005 | Dutov et al. |
| 7,177,057 B2 | 2/2007 | Morrow et al. |
| 7,460,577 B2 | 12/2008 | Morrow |
| 7,480,323 B2 | 1/2009 | Murray |
| 7,570,683 B1 | 8/2009 | Broderick et al. |
| 7,889,775 B2 * | 2/2011 | Hua | H01S 3/0315 372/55 |
| 8,295,319 B2 | 10/2012 | Morrow et al. |
| 8,422,528 B2 | 4/2013 | Morrow et al. |
| 10,404,030 B2 | 9/2019 | Morrow et al. |
| 2003/0010420 A1 * | 1/2003 | Morrow | H01S 3/0305 156/89.11 |
| 2003/0048826 A1 | 3/2003 | Bethel et al. |
| 2005/0057640 A1 | 3/2005 | Clarke et al. |
| 2005/0105581 A1 | 5/2005 | Seguin et al. |
| 2005/0175054 A1 | 8/2005 | Shackleton et al. |
| 2006/0029116 A1 | 2/2006 | Shackleton et al. |
| 2007/0041418 A1 | 2/2007 | Laughman et al. |
| 2008/0101430 A1 | 5/2008 | Morrow |
| 2008/0123707 A1 | 5/2008 | Murray |
| 2008/0124433 A1 | 5/2008 | Yelden et al. |
| 2008/0144675 A1 | 6/2008 | Spinelli et al. |
| 2008/0285607 A1 | 11/2008 | Murray |
| 2008/0285613 A1 | 11/2008 | Murray |
| 2009/0110016 A1 | 4/2009 | Markillie |
| 2016/0233640 A1 * | 8/2016 | Morrow | H01S 3/0816 |

FOREIGN PATENT DOCUMENTS

| | | |
|---|---|---|
| GB | 2477106 A | 7/2011 |
| JP | 3479197 B2 | 12/2003 |
| WO | 99/39410 A1 | 8/1999 |

OTHER PUBLICATIONS

Synrad, Inc., Firestar V-Series CO2 Lasers Overview, 1 page, www.synrad.com/vseries/index.htm.
Synrad, Inc., Firestart V-Series 30 & 40 CO2 Lasers, 4 pages.
Synrad, Inc., 30 Watt CO2 Laser with Its Compact Size, Near-Perfect Beam Quality and Fast Rise Times, the Synrad v30 CO2 Laser Provides Users with the Ultimate Low Power CO2 Laser Tool, 1 page, www.synrad.com/vseries/v30.htm.
Synrad, Inc., Firestart Oem v30 Reference Guide, Version 3.2, Jun. 2012, 36 pages.
Synrad, Inc., Synrad's Firestar v40, 2 pages, www.synrad.com/vseries/v40.htm.
Synrad, Inc., Synrad's Firestar v40 Version D Operator's Manual, Version 3.1, Sep. 2010, 106 pages.
Tamanuki et al., "High Power and Narrow Lateral Far-Field Divergence 1.5 m Eye-Safe Pulsed Laser Diodes with Flared Waveguide," Opt. and Quantum Electron., vol. 28, pp. 513-517 (1996).
European Patent Office, Supplemental European Search Report for related EP 17853776.7, dated Apr. 17, 2020, 6 pages.
China National Intellectual Property Administration, First Office Action for related CN 201780064792.0, dated Jun. 16, 2020, 12 pages (with translation).

* cited by examiner

LASERS WITH SETBACK APERTURE

CROSS-REFERENCE TO RELATED APPLICATIONS

This application is a national stage entry made under 35 U.S.C. § 371 of PCT International Application No. PCT/US2017/052414, filed on Sep. 20, 2017, which claims the benefit of and priority to U.S. Provisional Application Ser. No. 62/397,155, filed on Sep. 20, 2016. The entire disclosure of each of the foregoing applications is incorporated herein by reference.

TECHNICAL FIELD

The present disclosure relates, generally, to lasers and, more particularly, to lasers with a setback aperture.

BACKGROUND ART

FIG. 1 illustrates certain components of a prior art laser utilizing a slab waveguide resonator. It will be appreciated by those skilled in the art that numerous components of the laser are not shown in FIG. 1 for clarity. The laser of FIG. 1 includes two waveguide walls 8, 9, a rear mirror 11, and a front mirror 12, which cooperate to form an unstable slab waveguide resonator. A laser gas 10 is disposed in the resonator and, when excited, produces a laser beam. The laser beam exits the resonator at an aperture 13 positioned near the front mirror 12.

Slab waveguide resonators (like that illustrated in FIG. 1, by way of example) typically generate a laser beam that leaves the resonator at the aperture 13 with a generally elliptical cross-sectional profile having different divergences in the waveguide and unstable directions (the "y" and "x" directions, respectively, in FIG. 1). An example of these different divergences is illustrated in FIG. 2, showing the cross-sectional profile of the laser beam expanding faster in the waveguide direction and slower in unstable direction as the laser beam travels away from the aperture 13. However, for most applications, it is desirable for a laser to produce a beam that is as circular as possible.

Additionally, due to a relatively small cross-sectional dimension in the waveguide direction, the laser beam has a relatively small cross-sectional profile at the aperture 13. As such, the laser beam has a high energy density that can be damaging to an output window positioned adjacent the front mirror 12. Some prior art lasers have utilized a tapered waveguide, either internal to the laser's gain medium (see, e.g., U.S. Pat. No. 6,614,826) or external to the laser's gain medium (see, e.g., U.S. Pat. No. 8,295,319), leading up to the aperture 13 to address the above issues.

As illustrated in FIG. 3, other prior art lasers have utilized external beam-shaping optics to address the above issues. Once again, it will be appreciated by those skilled in the art that numerous components of the laser are not shown in FIG. 3 for clarity. Like the laser of FIG. 1, the laser of FIG. 3 includes two waveguide walls 8, 9, a rear mirror 11, and a front mirror 12, which cooperate to form an unstable slab waveguide resonator. A laser gas 10 is disposed in the resonator and, when excited, produces a laser beam. The laser beam exits the resonator at an aperture 13 positioned near the front mirror 12. An output window 14 (which helps to maintain the laser gas 10 within the resonator) is positioned adjacent the aperture 13. One or more corrective lenses 15 are positioned outside the laser.

As illustrated in FIG. 4, the corrective lens 15 is often located at a distance from the aperture 13 at which the laser beam has expanded to have a generally round (or circular) cross-sectional profile. The corrective lens 15 modifies the divergence of the laser beam in the waveguide and/or unstable directions such that the generally round (or circular) cross-sectional profile is (largely) maintained as the laser beam propagates further away from the aperture 13.

SUMMARY OF INVENTION

Illustrative embodiments of the invention are described in the following enumerated clauses. Any combination of the following clauses is contemplated, along with any applicable combination with the embodiments described in the Detailed Description of Illustrative Embodiments below.

1. A laser comprising front and rear resonator mirrors, an output window positioned near the front resonator mirror, and a plurality of waveguide walls extending between the front and rear resonator mirrors and extending between the rear resonator mirror and an aperture defined by the plurality of waveguide walls, such that a laser beam formed between the front and rear resonator mirrors will propagate in free-space between the aperture and the output window so that a first cross-sectional profile of the laser beam at the aperture will be different than a second cross-sectional profile of the laser beam at the output window.

2. The laser of clause 1, wherein the front and rear resonator mirrors, the output window, and the plurality of waveguide walls cooperate to form an unstable slab waveguide resonator.

3. The laser of clause 2, wherein the laser beam exits the resonator at the aperture.

4. The laser of any one of clauses 1-3, wherein the plurality of waveguide walls are formed of an electrically insulating material.

5. The laser of clause 4, wherein the electrically insulating material comprises a ceramic.

6. The laser of any one of clauses 1-5, wherein the front and rear resonator mirrors, the output window, and a body comprising the plurality of waveguide walls cooperate to form an airtight enclosure for a laser gas.

7. The laser of clause 6, further comprising electrodes positioned outside of the airtight enclosure.

8. The laser of clause 7, wherein the electrodes are positioned so as to excite only a portion of the laser gas.

9. The laser of clause 8, wherein the electrodes are positioned so as to excite only the portion of the laser gas between the front and rear resonator mirrors.

10. The laser of clause 8, wherein the electrodes are positioned so as to not excite the portion of the laser gas between the rear resonator mirror and the output window.

11. The laser of clause 6, wherein the body further comprises a plurality of non-waveguide walls extending between the aperture and the output window.

12. The laser of clause 11, wherein a gap between the plurality of non-waveguide walls is greater than a gap between the plurality of waveguide walls.

13. The laser of any one of clauses 1-3, 6, 11, and 12, wherein the plurality of waveguide walls are formed of an electrically conductive material.

14. The laser of clause 13, wherein the electrically conductive material comprises a metal or metal alloy.

15. The laser of clause 13 or clause 14, wherein the plurality of waveguide walls function as electrodes of the laser.

16. The laser of any preceding clause, wherein the output window comprises a corrective lens.

17. The laser of any one of clauses 1-15, further comprising a corrective lens, wherein the output window is positioned between the corrective lens and the aperture.

18. The laser of clause 17, wherein the corrective lens is positioned adjacent the output window.

19. The laser of clause 17, wherein a first distance between the aperture and the output window is larger than a second distance between the output window and the corrective lens.

20. The laser of any preceding clause, wherein the first cross-sectional profile is generally elliptical and the second cross-sectional profile is generally round.

BRIEF DESCRIPTION OF DRAWINGS

The concepts described in the present disclosure are illustrated by way of example and not by way of limitation in the accompanying figures. For simplicity and clarity of illustration, elements illustrated in the figures are not necessarily drawn to scale. Further, where considered appropriate, reference labels have been repeated among the figures to indicate corresponding or analogous elements. The Detailed Description of Illustrative Embodiments below particularly refers to the accompanying figures in which.

DETAILED DESCRIPTION OF ILLUSTRATIVE EMBODIMENTS

Figure 1:
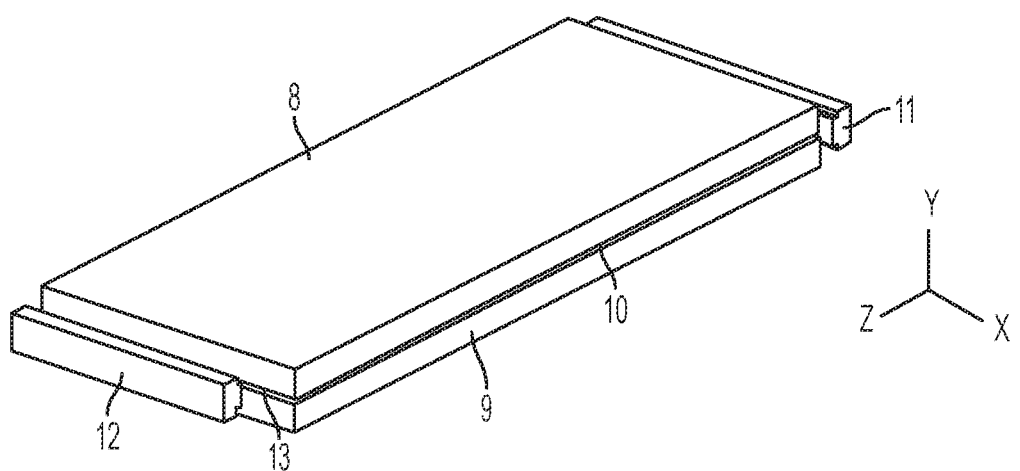
FIG. 1 illustrates certain components of a prior art laser utilizing a slab waveguide resonator.
Figure 2:
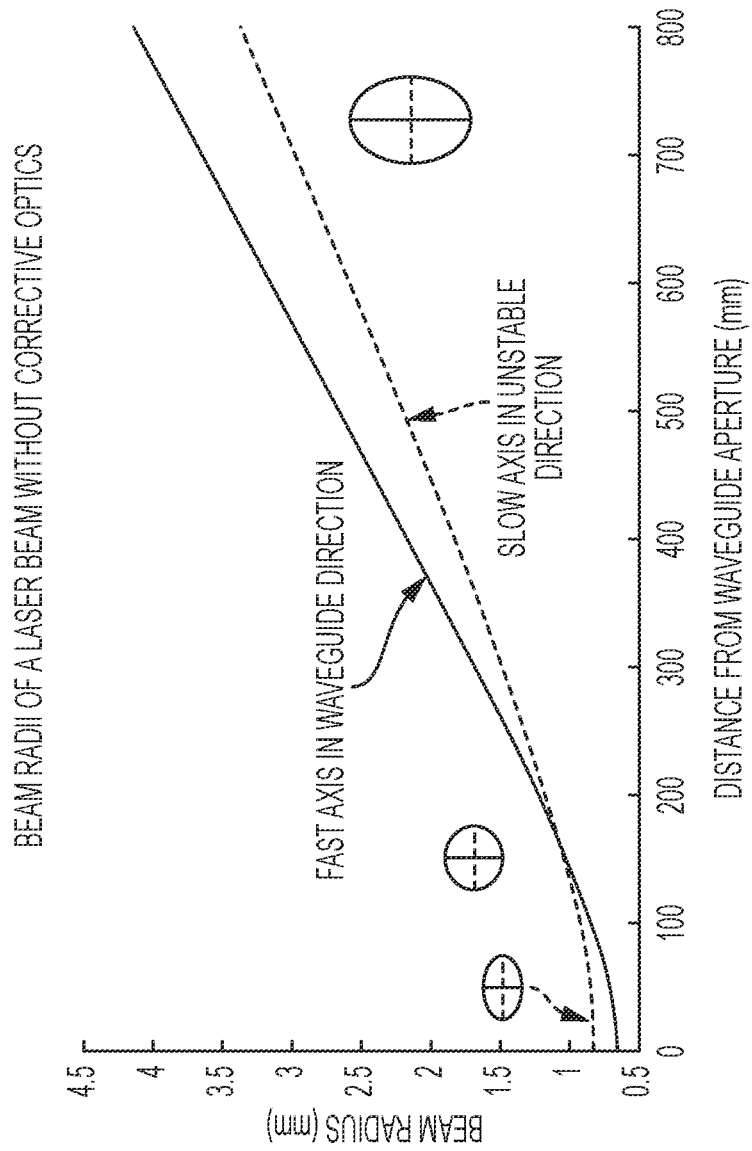
FIG. 2 illustrates a relationship between two beam radii of a laser beam generated by the laser of FIG. 1.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the description to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

Figure 5:
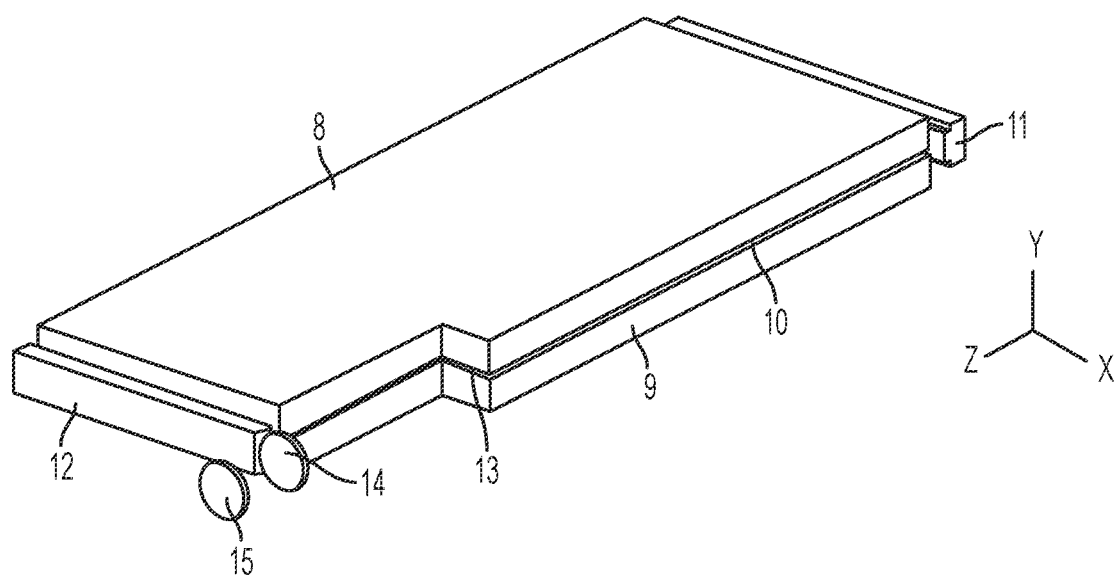
FIG. 5 illustrates certain components of one embodiment of a laser with a setback aperture according to the present disclosure.

Lasers according to the present disclosure are able to address the issues of slab waveguide resonators discussed above, without the need for either a tapered waveguide or external optics. Instead, lasers according to the present disclosure utilize a waveguide resonator with a setback aperture. One illustrative example of such a laser is shown in FIG. 5. Once again, it will be appreciated by those skilled in the art that numerous components of the laser are not shown in FIG. 5 for clarity.

Figure 3:
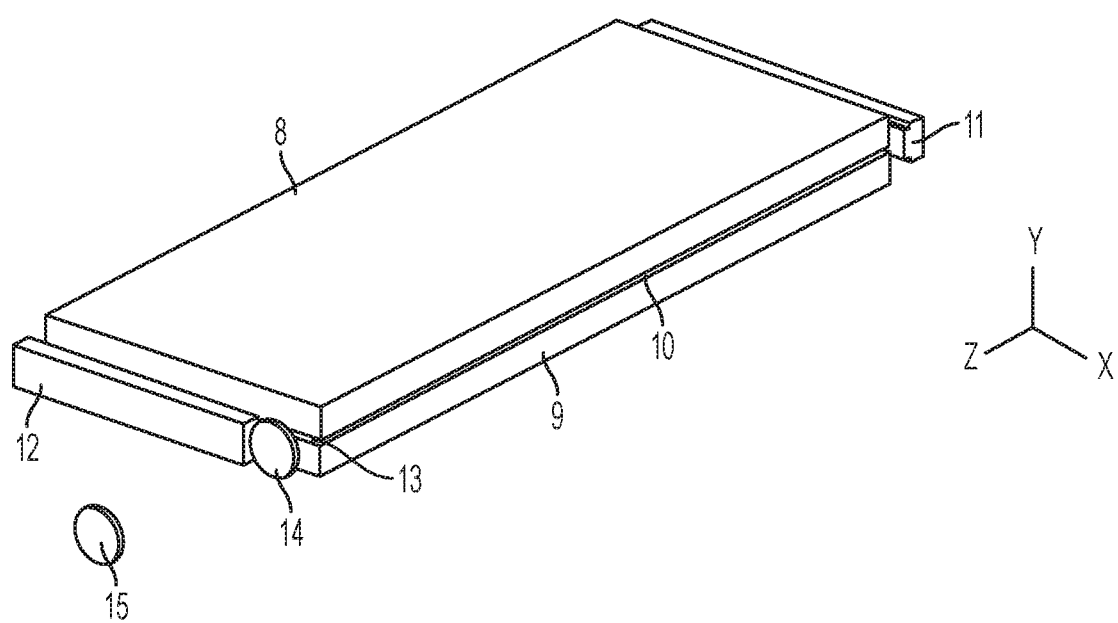
FIG. 3 illustrates certain components of another prior art laser utilizing a slab waveguide resonator and external beam-shaping optics.
Figure 4:
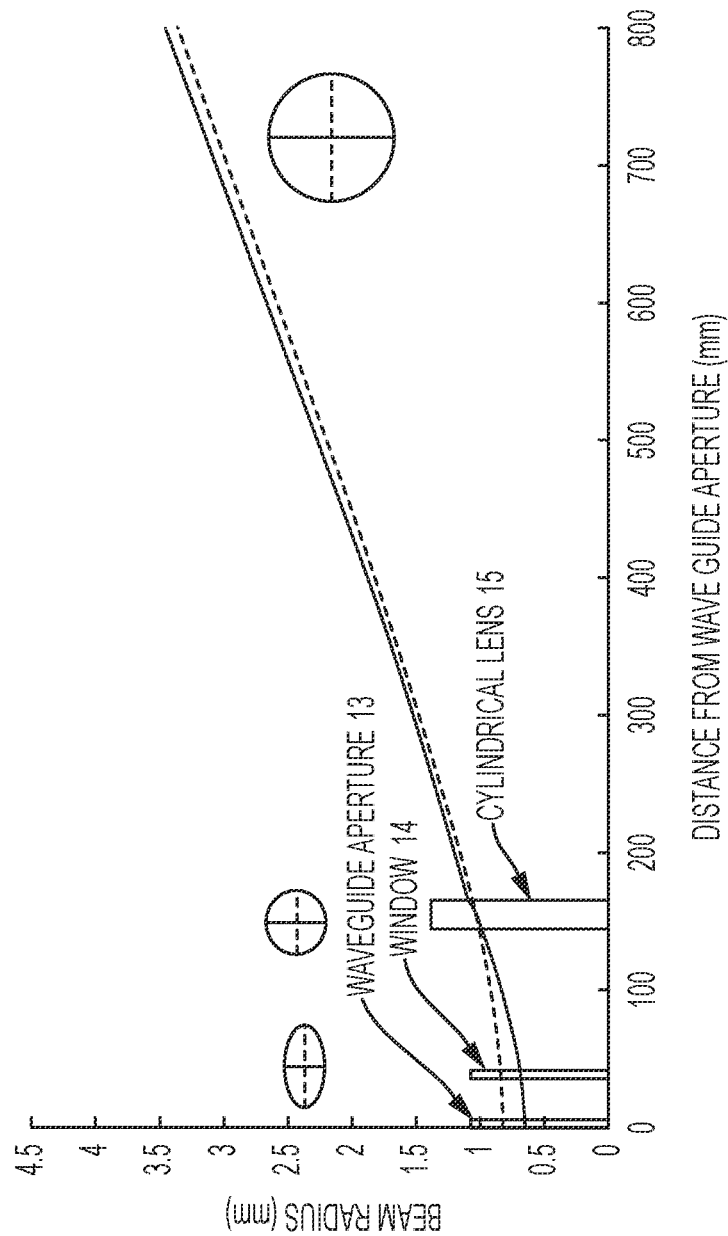
FIG. 4 illustrates a relationship between two beam radii of a laser beam generated by the laser of FIG. 3.

Like the lasers of FIGS. 1 and 3, the laser of FIG. 5 includes two waveguide walls 8, 9, a rear mirror 11, and a front mirror 12, which cooperate to form an unstable slab waveguide resonator. A laser gas 10 is disposed in the resonator and, when excited, produces a laser beam. The laser beam exits the resonator at an aperture 13.

In the illustrative embodiment shown in FIG. 5, the two waveguide walls 8, 9 are formed of an electrically insulating material. In particular, the waveguide walls 8, 9 are part of a ceramic body that—together with the rear mirror 11, the front mirror 12, and an output window 14—forms an airtight enclosure for the laser gas 10. In other embodiments, the two waveguide walls 8, 9 may be formed of an electrically conductive material, such as a metal or metal alloy. In such embodiments, the waveguide walls 8, 9 may also function as electrodes to excite the laser gas 10.

In contrast to the lasers of FIGS. 1 and 3, the aperture 13 of the laser of FIG. 5 is not positioned near the front mirror 12. Instead, the aperture 13 of the laser of FIG. 5 is set back from the front mirror 12. In some embodiments (such as that shown in FIG. 5), the aperture may be set back from the front mirror 12 by cutting out sections of the waveguide walls 8, 9. This setback allows the laser beam to expand naturally as it propagates from the aperture 13 to the output window 14 (and possibly beyond) until reaching one or more corrective lenses 15.

In some embodiments, the waveguide walls 8, 9 may be absent in the portion of the resonator between the setback aperture 13 and the output window 14. In other embodiments, the walls 8, 9 may be present in the portion of the resonator between the setback aperture 13 and the output window 14, but there may be a greater gap between the walls 8, 9 in that portion than in the remainder of the resonator. In either case, the laser beam is not waveguided in the portion of the resonator between the setback aperture 13 and the output window 14 but is instead allowed to propagate in free-space, not interacting with any walls that may be present.

Figure 6:
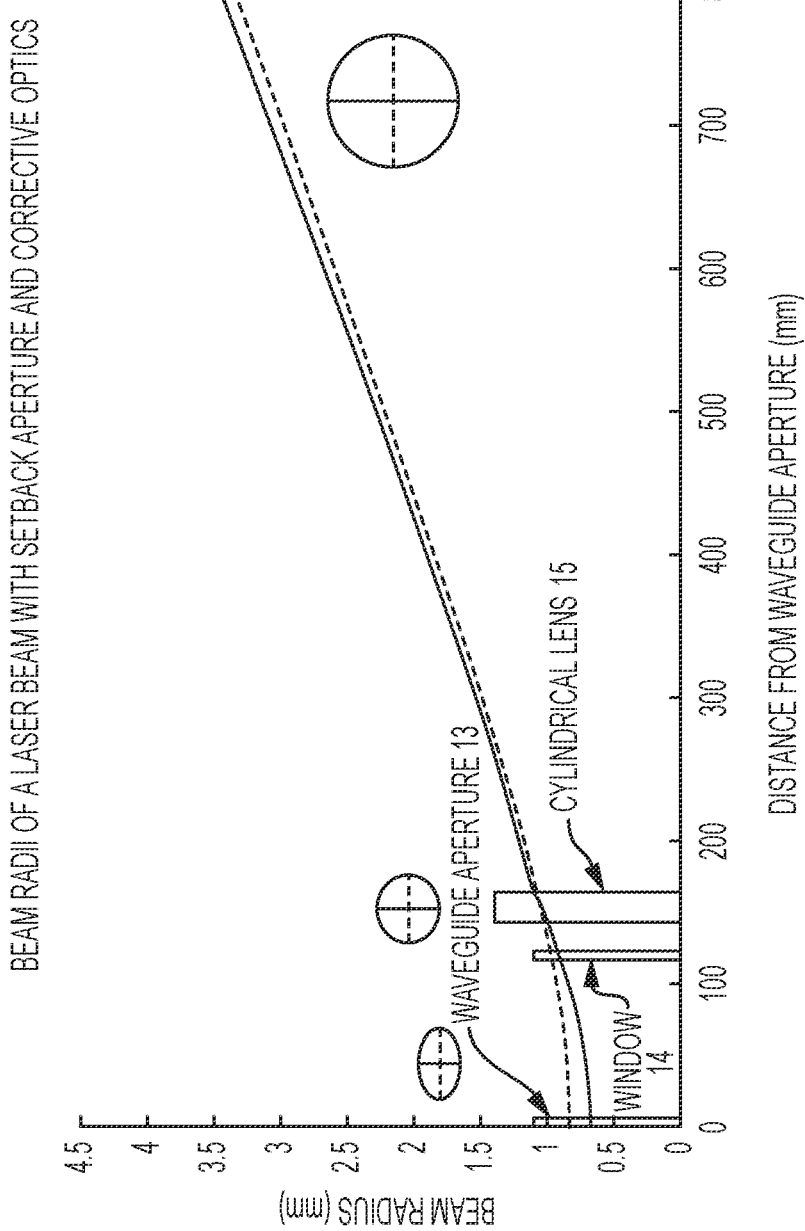
FIG. 6 illustrates a relationship between two beam radii of a laser beam generated by the laser of FIG. 5.

As illustrated in FIG. 6, a distance between the setback aperture 13 and the output window 14 may be larger than a distance between the output window 14 and the corrective lens 15 in lasers according to the present disclosure. Such a configuration allows the corrective lens 15 to be located near or even adjacent the output window 14 (or, in some embodiments, to even be combined with the window 14 into a single optical element) while still achieving a generally round beam at the corrective lens 15. Additionally, the cross-sectional profile of the laser beam will typically be larger at the output window 14 in lasers according to the present disclosure (as compared to prior art lasers), reducing the possibility of damage to the output window 14.

Figure 7:
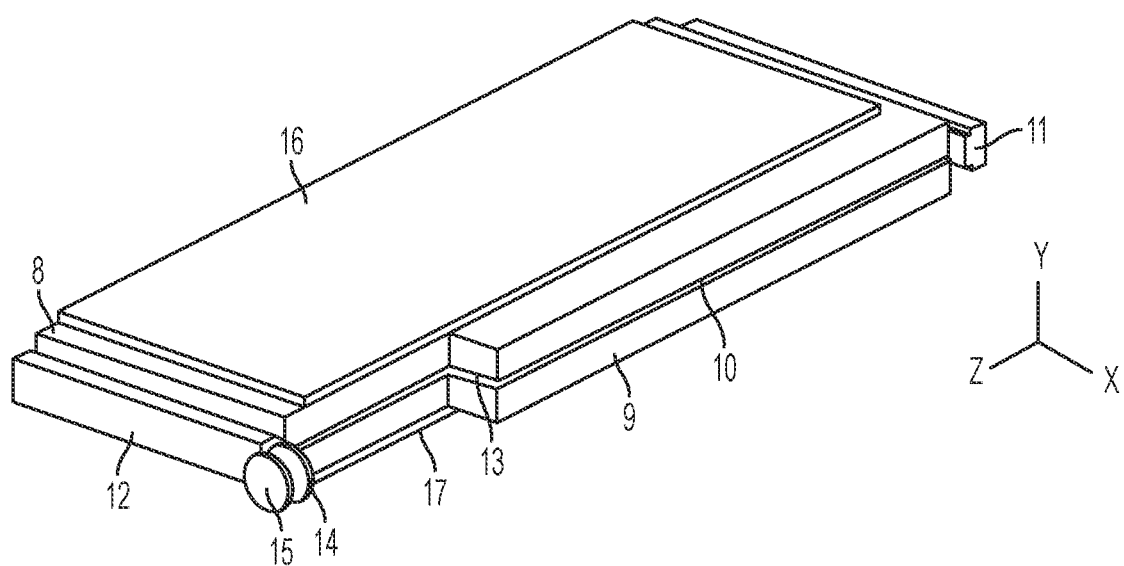
FIG. 7 illustrates certain components of another embodiment of a laser with a setback aperture according to the present disclosure.

It is contemplated that, in some embodiments of lasers according to the present disclosure (such as those having ceramic waveguide walls 8, 9), electrodes of the laser may be positioned outside the waveguide walls 8, 9 so as to excite only a desired portion of the laser gas 10. One illustrative embodiment of a laser with such an electrode configuration is shown in FIG. 7 (which is generally similar to the laser of FIG. 5). The electrodes 16, 17 of the laser of FIG. 7 are positioned outside the waveguide walls 8, 9 so as to excite only the portion of the laser gas 10 between the front and rear mirrors 11, 12 and not the portion of the laser gas 10 between the rear mirror 11 and the output window 14. Once again, it will be appreciated by those skilled in the art that numerous components of the laser are not shown in FIG. 7 for clarity.

The entire disclosures of U.S. Pat. No. 8,422,528 and U.S. Patent Application Publication No. 2016/0233640 are incorporated by reference herein. Any of the lasers described in the present application may possess any of the features described in the foregoing references (except to the extent such features are inconsistent with the disclosure of the present application).

While certain illustrative embodiments have been described in detail in the figures and the foregoing description, such an illustration and description is to be considered as exemplary and not restrictive in character, it being understood that only illustrative embodiments have been shown and described and that all changes and modifications that come within the spirit of the disclosure are desired to be protected. There exist a plurality of advantages of the present disclosure arising from the various features of the apparatus, systems, and methods described herein. It will be noted that alternative embodiments of the apparatus, systems, and methods of the present disclosure may not include all of the features described, yet still benefit from at least some of the advantages of such features. Those of ordinary skill in the art may readily devise their own implementations of the apparatus, systems, and methods that incorporate one or more of the features of the present disclosure.

What is claimed is:

1. A laser comprising:
   front and rear resonator mirrors;
   an output window positioned near the front resonator mirror; and
   a body comprising (i) a plurality of waveguide walls extending between the front and rear resonator mirrors and extending between the rear resonator mirror and an aperture defined by the plurality of waveguide walls and (ii) a plurality of non-waveguide walls extending between the aperture and the output window, such that a laser beam formed between the front and rear resonator mirrors will propagate in free-space between the aperture and the output window so that a first cross-sectional profile of the laser beam at the aperture will be shaped differently than a second cross-sectional profile of the laser beam at the output window,
   wherein the front and rear resonator mirrors, the output window, and the body cooperate to form an airtight enclosure for a laser gas.

2. The laser of claim 1, wherein the front and rear resonator mirrors, the output window, and the plurality of waveguide walls cooperate to form an unstable slab waveguide resonator.

3. The laser of claim 2, wherein the laser beam exits the resonator at the aperture.

4. The laser of claim 1, wherein the plurality of waveguide walls are formed of an electrically insulating material.

5. The laser of claim 4, wherein the electrically insulating material comprises a ceramic.

6. The laser of claim 1, further comprising electrodes positioned outside of the airtight enclosure.

7. The laser of claim 6, wherein the electrodes are positioned so as to excite only a portion of the laser gas.

8. The laser of claim 7, wherein the electrodes are positioned so as to excite only the portion of the laser gas between the front and rear resonator mirrors.

9. The laser of claim 7, wherein the electrodes are positioned so as to not excite the portion of the laser gas between the rear resonator mirror and the output window.

10. The laser of claim 1, wherein a gap between the plurality of non-waveguide walls is greater than a gap between the plurality of waveguide walls.

11. The laser of claim 1, wherein the plurality of waveguide walls are formed of an electrically conductive material.

12. The laser of claim 11, wherein the electrically conductive material comprises a metal or metal alloy.

13. The laser of claim 11, wherein the plurality of waveguide walls function as electrodes of the laser.

14. The laser of claim 1, wherein the output window comprises a corrective lens.

15. The laser of claim 1, further comprising a corrective lens, wherein the output window is positioned between the corrective lens and the aperture.

16. The laser of claim 15, wherein the corrective lens is positioned adjacent the output window.

17. The laser of claim 15, wherein a first distance between the aperture and the output window is larger than a second distance between the output window and the corrective lens.

18. The laser of claim 1, wherein the first cross-sectional profile is generally elliptical and the second cross-sectional profile is generally round.

19. The laser of claim 1, wherein the cross-sectional profile of the laser beam transitions from the first cross-sectional profile to the second cross-sectional profile as the laser beam propagate in free-space from the aperture to the output window.

20. The laser of claim 1, wherein a first aspect ratio between vertical and horizontal beam radii of the first cross-sectional profile is different from a second aspect ratio between vertical and horizontal beam radii of the second cross-sectional profile.

* * * * *